A. A. BOWSER.
BUNG FAUCET.
APPLICATION FILED JUNE 23, 1906.

920,908.

Patented May 11, 1909.

Witnesses
J. B. Weir
W. P. Kilroy

Inventor:
Allen A. Bowser

THE NORRIS PETERS CO., WASHINGTON, D. C.

UNITED STATES PATENT OFFICE.

ALLEN A. BOWSER, OF FORT WAYNE, INDIANA, ASSIGNOR TO S. F. BOWSER & COMPANY, OF FORT WAYNE, INDIANA, A CORPORATION OF INDIANA.

BUNG-FAUCET.

No. 920,908.   Specification of Letters Patent.   Patented May 11, 1909.

Application filed June 23, 1906. Serial No. 323,042.

*To all whom it may concern:*

Be it known that I, ALLEN A. BOWSER, a citizen of the United States, residing at Fort Wayne, in the county of Allen and State of Indiana, have invented certain new and useful Improvements in Bung-Faucets, of which the following is a full, clear, and exact specification.

My invention relates to improvements in bung faucets and has for its primary object to provide an improved means for attaching faucets or nozzles to the bung holes of barrels or other vessels from which liquids are to be drawn.

To the attainment of these ends and the accomplishment of other new and useful objects as will appear, the invention consists in the features of novelty in the construction, combination and arrangement of the several parts, hereinafter more fully described and claimed and shown in the accompanying drawings, illustrating an exemplification of this invention, and in which;—

Figure 1:
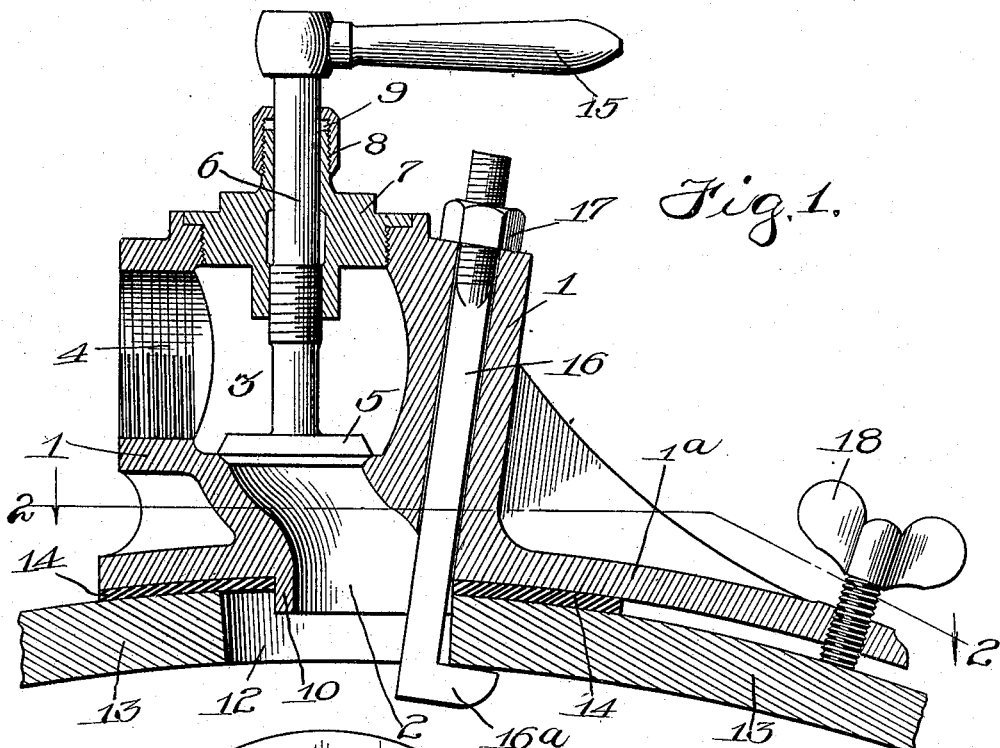
Figure 2:
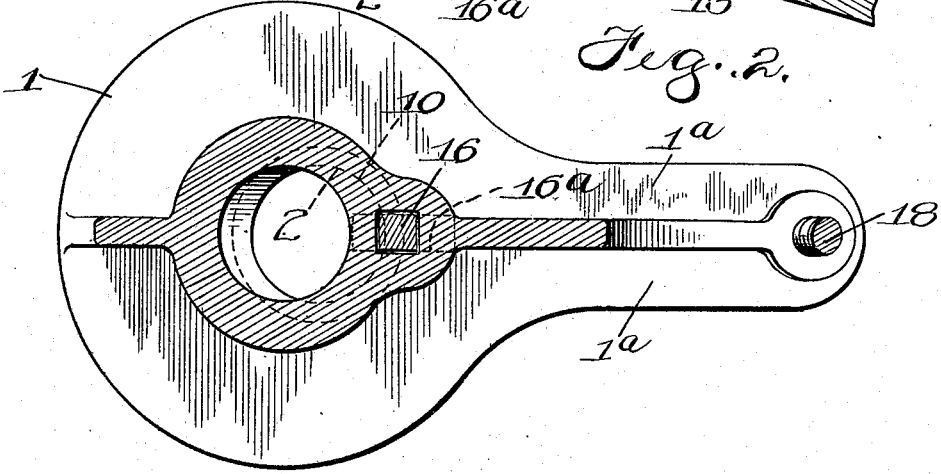

Figure 1 is a longitudinal sectional view in elevation of my device; Fig. 2 is a sectional plan view on line 2—2 of Fig. 1.

1 designates main frame and consists of a body portion and a laterally extending member 1ª. The body portion is formed with an intake 2, an inner chamber 3 and outlet or discharge orifice 4. Intake 2 is surrounded by short downwardly extending flange 10 which enters the bung hole 12 of a barrel, a broken section of the wall or side of which is shown by 13 in Fig. 1. A valve or gate 5 controls opening between 2 and 3.

6 is the valve stem preferably journaled and threaded in member 7 which is threaded into main frame or attached thereto by other convenient means closing the top of chamber 3. A cap 8 forms with 7 packing chamber 9. Handle 15 or other convenient means mounted on stem 6 controls the valve.

In the body member I insert the hook bolt 16 the lower opening for which cuts into the intake 2 to permit the bolt and hook 16ª formed on its lower end to enter the bung hole. I show this bolt and its corresponding hole rectangular in cross section in order to retain the hook portion in the proper position to engage the inside of that portion of the wall of a barrel or cask immediately surrounding the bung hole. The upper end of bolt 16 is threaded and a nut 17 inserted thereon. This nut may be operated by a socket wrench or other convenient means.

14 is a washer or gasket surrounding the flange 10 and intake 2 and should be an elastic substance or composition not easily affected by oils or liquids to be handled.

Laterally extending member 1ª is provided near its outward extremity with a set screw 18 threaded therein and adapted to bear against 13 and is provided with convenient means for operating as the common winged members shown.

In inserting my faucet the hook bolt should be protruded downwardly a sufficient distance to enable the hook to be readily inserted under the wall of the barrel. The set screw should also be withdrawn so that its bearing portion is approximately flush with the lower edge of the laterally extending member. When the hook bolt is tightened on the gasket contact with main frame and barrel wall is formed on approximately one-half the gasket circumference which lies adjacent to the hook bolt. The contact is completed by forcing the outer end of the laterally extending member away from the barrel wall by means of the set screw which acting on the contact of the hook bolt and wall of barrel as a fulcrum forces the end of the main frame opposite the laterally extending member in direction of the barrel wall.

In order that the invention might be fully understood the details of an embodiment thereof have been thus specifically described, but

What I claim is:—

1. In a device of the character described, the combination with a main body member provided with an inner chamber having an intake passage leading thereto provided with an off-set, and a discharge orifice, of a valve or gate adapted to close the opening between the intake passage and the inner chamber, a laterally extending branch on the said main body member, means adapted to attach said main body member to the wall of a barrel or cask, and adjustable means adapted to separate said laterally extending member from the barrel or cask wall.

2. In a device of the character described, the combination with a main body member provided with an inner chamber, an intake passage communicating between the inner chamber and the exterior of the main body member, and a discharge passage leading from the said inner chamber, of means adapted to control the opening between the said intake passage and inner chamber, a depending flange surrounding the exterior end of the said intake passage, an attaching hook bolt adapted for insertion through the bung hole of the barrel, means on said main body member surrounding the said pending flange adapted to coöperate with the wall of the barrel or cask to form a liquid proof joint, and an integral branch on said main body member provided with means whereby the said branch may be forced apart from the cask or barrel wall thereby forming with the attaching hook bolt as a fulcrum a liquid proof joining with the wall of a barrel or cask immediately surrounding the bung hole thereof.

In testimony whereof I have signed my name to this specification, in the presence of two subscribing witnesses, on this 18 day of June A. D. 1906.

ALLEN A. BOWSER.

Witnesses:
WILLIAM A. BUSCH,
C. F. HATMAKER.